UnitedStates Patent Office 3,474,070
Patented Oct. 21, 1969

3,474,070
METHODS FOR PREPARING ORGANOPOLY-
SILOXANES USING FERRIC-CONTAINING
CATALYSTS
Leon Levene, Toledo, Ohio, assignor to Owens-Illinois,
Inc., a corporation of Ohio
No Drawing. Continuation-in-part of application Ser. No.
652,722, July 12, 1967. This application Jan. 10, 1969,
Ser. No. 790,484
Int. Cl. C08g 31/16
U.S. Cl. 260—46.5                                  22 Claims

ABSTRACT OF THE DISCLOSURE

Methods for hydrolyzing trifunctional organic silanes such as methyltrialkoxysilane, phenyltrialkoxysilane, or mixtures thereof at neutral conditions using an iron-containing hydrolysis catalyst such as a ferric alkoxide or a ferric chelate. The resultant heat curable, solvent-soluble prepolymer is used to prepare excellent laminates, moldings, and hard, clear, flexible coatings.

CROSS REFERENCE TO RELATED APPLICATIONS

This application is a continuation-in-part of copending application Ser. No. 652,722 filed July 12, 1967, now abandoned which application is assigned to the same assignee as that of the present application.

THE INVENTION

The present invention relates to methods of hydrolyzing alkyl or aryl trialkoxysilanes at neutral conditions to provide organic solvent-soluble, further curable organopolysiloxane prepolymers and thermoset organopilysiloxanes prepared therefrom.

In the past, it has been difficult to hydrolyze and condense reproducibly organic trifunctional silanes such as methyltrialkoxysilanes by an acid-catalyzed hydrolysis. The amount of acid catalyst such as hydrochloric acid used must be carefully controlled and a slight deviation from an exact prescribed amount as a result of an inadvertent mistake can cause a large variation in the polymer produced thereby. The reactions of hydrolysis and condensation are quite fast and sensitive and they generally cannot be easily controlled.

Accordingly, it is an object of the present invention to provide reproducible and economical methods of controllably hydrolyzing organic trifunctional silane monomers such as methyltrialkoxysilane and phenyltrialkoxysilane employing neutral conditions and an iron-containing hydrolysis catalyst such as a ferric alkoxide or a ferric chelate.

It is an object of the present invention to provide a method of controlling the hydrolysis of an alkyl or aryltrialkoxysilane by employing substantially neutral conditions and a hydrolysis catalyst such as a ferric alkoxide including ferric tributoxide or a ferric chelate including ferric triacetylacetonate.

It is an object of the present invention to provide a method of hydrolyzing an organic trialkoxysilane monomer such as methyltrialkoxysilane and preparing a solvent-soluble further curable organopolysiloxane prepolymer therefrom, the method including:

(A) Heating a mixture of (1) an organic trialkoxysilane; (2) an effective amount of a hydrolysis catalyst such as a ferric alkoxide or a ferric chelate; and (3) at least about 1.5 moles of water for every mole of silane at a temperature of about 25° to 160° C. for about 1 to 20 hours to form an organopolysiloxane prepolymer; and (B) Separating the prepolymer product of Step A from the reaction mixture to obtain a solvent-soluble further curable organopolysiloxane.

It is an object of the present invention to provide a method of hydrolyzing an organic trialkoxysilane monomer and ultimately preparing a thermoset organopolysiloxane from the hydrolyzed prepolymer product, the method including:

(A) Heating a mixture of (1) a silane such as methyltrialkoxysilane, phenyltrialkoxysilane and mixtures thereof; (2) a ferric alkoxide hydrolysis catalyst such as ferric tributoxide in an amount equivalent to about 10 to 200 parts by weight of iron per million parts of silane and water; and (3) at least about 1.5 moles of water per mole of silane, at a temperature of preferably about 75 to 85° C. for at least about one hour to form an organopolysiloxane prepolymer product having a viscosity equivalent to that of preferably about 30 to 65 centipoises at 60% solids at 25° C. in ethanol; and (B) Curing the product of Step A at about 90° to 300° C. or higher for at least about one minute to provide a hard, clear acetone-resistant thermoset organopolysiloxane.

These and other objects will become apparent from the specification that follows and the appended claims.

The present invention provides a method of hydrolyzing an organic trialkoxysilane monomer and preparing a solvent-soluble further curable organopolysiloxane prepolymer therefrom, the method comprising the steps of:

(A) Heating a mixture of (1) a silane which is selected from the group consisting of methyltrialkoxysilane, phenyltrialkoxysilane and mixtures thereof in which the alkoxy group contains 1 to 6 carbon atoms; (2) an effective catalytic amount of hydrolysis catalyst such as a ferric alkoxide or ferric chelate; and (3) at least about 1.5 moles of water for every mole of silane at a temperature of about 25° to 160° C. for about 1 to 20 hours to form an organopolysiloxane partial condensation product prepolymer having a viscosity equivalent to that of about 30 to 300 centipoises at 60% solids at 25° C. in ethanol; and (B) Separating the resultant prepolymer from Step A to obtain a solvent-soluble further curable organopolysiloxane.

The present invention also provides a method of hydrolyzing an organic trialkoxysilane monomer as above described and preparing a thermoset organopolysiloxane from the solvent-soluble, further curable prepolymer by curing the prepolymer at about 90° to 300° C. or higher for at least one minute up to 168 hours or more to provide a hard, clear, chemical resistant, thermoset organopolysiloxane.

The preferred ferric alkoxide hydrolysis catalysts are ferric tributoxide and ferric triisopropoxide, although other ferric alkoxides can be used in which the alkoxy group contains from 1 to 6 carbon atoms. Preferred ferric chelate catalysts are ferric triacetylacetonate and ferric dibutoxymonoacetylacetonate, although other ferric dialkoxymonoacetonates can be used in which the alkoxy radical has from 1 to 4 carbon atoms. The above alkoxides and chelates do not precipitate out during the reactions. Generally, at least a trace amount of the catalyst is necessary to obtain the controllable hydrolysis and, hence an amount in the neighborhood of as low as about 0.01 part per million to about 1 or 2 parts by weight of iron per million parts of silane and water can be used to obtain benefits of the present invention. Usually, about 10 to 200 or 250 parts per million of the iron content of the catalyst are used although the preferred range is about 20 to 100 parts per million. When the amount of catalyst becomes greater than about 250 parts per million based on the iron content of the catalyst, the catalyst is being used in excess of that needed which is generally costly and wasteful. Also, when too much is used, the catalyst may cause precipitation and/or enough of the iron atoms will enter the polymer structure to affect adversely the properties of the polymer obtained.

Some suitable iron chelates are iron derivatives of 8-hydroxy-quinolines, orthohydroxy carboxylic acids such as salicylic acid, and orthohydroxybenzenes such as pyrocatechol and pyrogallol. Suitable ferric chelates are ferric trifluoroacetonate, ferric 2-furoyl trifluoroacetone, ferric 2-pyrroyl trifluoroacetone, ferric 2-thenoyltrifluoroacetone, ferric 2-furoyl acetone, ferric 2-thenoylacetone, and ferric benzoylacetonate.

The iron chelates useful in the present invention are compounds composed of a chelate (chelate-forming) structure which contains at least two donor groups so located with respect to one another that they are capable of forming a chelate ring (normally of 5 or 6 members) with an iron atom. The aforementioned donor groups, and hence the chelate-forming structures or ligands therefrom, contain many different donor atoms among which may be mentioned by way of example oxygen, sulfur and nitrogen atoms. Optimum results in practicing the present invention have been obtained when the donor atom is an oxygen atom.

The donor groups are well known and recognized by those skilled in the art of chelate chemistry. See, for example, the following literature references concerning chelate chemistry and lists of principal donor groups: "The Chelate Rings," by H. Diehl; "Chemical Reviews," 21, 39–111 (1937); and "Chemistry of the Metal Chelate Compounds," by Martell and Calvin, published in 1952 by Prentice-Hall, Inc., New York, N.Y. (1952).

The iron atom in the ferric chelate, according to the present invention, is trivalent and the chelates can have the following formulations: $Fe^{III}(chelate)_3$. A preferred chelating agent is a di-ketone of the following general structure:

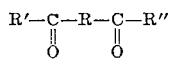

where $R=CH_2$.

As to R' and R'' in the formula, examples of these radicals are monovalent hydrocarbon, halohydrocarbon, oxyhydrocarbon and thiohydrocarbon radicals containing from 1 to 12 carbon atoms, inclusive. More specific examples of such radicals are aliphatic (including cycloaliphatic), aromatic-substituted aliphatic, aromatic, and aliphatic-substituted aromatic hydrocarbon radicals having from 1 through 12 carbon atoms such as alkyl, e.g., methyl, ethyl and propyl through dodecyl (both normal and isomeric forms), cyclopentyl, cyclohexyl, cycloheptyl, etc.; alkenyl, e.g., vinyl ethenyl, propenyl and other alkenyl radicals corresponding to the aforementioned alkyl radicals; aralkyl, e.g., benzyl, phenylethyl, phenylpropyl, etc.; aryl, e.g., phenyl, biphenylyl, naphthyl, etc.; alkaryl, e.g., tolyl, xylyl, diethylphenyl, dipropylphenyl, butylphenyl, etc.; the corresponding chlorinated, brominated and fluorinated derivatives (mono- through perhalogenated in the linear chain and/or in the aromatic nucleus); and the corresponding oxy and thio derivatives wherein one or more oxygen and/or sulfur atoms are positioned between carbon atoms in a linear chain and/or an aromatic ring. For instance, R' and/or R'' in the above formula may be alkoxyalkyl (e.g., methoxymethyl, -ethyl, -propyl, -butyl, -pentyl and -hexyl) or the corresponding thio derivatives; the methoxy- through pentoxyphenyls or the corresponding thio derivatives; or heterocyclic compounds containing one or more oxygen or sulfur atoms in the ring, e.g., thienyl, furyl and the like.

When the chelating agent employed is a ketone as embraced in the above formula, in certain cases one may use advantageously ketones boiling below 300° C. at 760 mm. pressure.

The chelating agents employed in the preparation of the ferric acylacetonates and other ferric chelates are those which are most readily available at minimum cost. Examples of classes of such chelating agents are the 1,3-diketones of which the diketones embraced by the above formula, the β-ketoesters are a preferred sub-class, the aromatic o-hydroxyaldehydes and esters. More specific examples of such chelating agents including those of the above-described formula are acetylacetone (2,4-pentanedione), benzoylacetone (1-phenyl-1,3-butanedione), dibenzoylmethane (1,3-diphenylpropanedione), 2-thenoylacetone, 2-furoylacetone, thenoyltrifluoroacetone, trifluoroacetylacetone, propionylacetone, butyrylacetone, 3-methyl-2,4-pentanedione, and 3-ethyl-2,4-pentanedione.

In addition, β-ketoesters such as ethylacetoacetate, methylacetoacetate and propylacetoacetate are suitable as ferric chelate hydrolysis catalysts in the present invention.

The preferred trifunctional materials are methyltrialkoxysilane or a mixture thereof with phenyltrialkoxysilane in which the alkoxy group is preferably ethoxy. It is preferred that the molar ratio of methyltrialkoxysilanes to phenyltrialkoxysilanes in a mixture of the two is about 2:1 for general molding and coating applications, although generally good results can be obtained using a ratio of about 1.5:1 to 2.5:1. A polymer for laminates in particular and also coatings and even flexible coatings can also be made with molar ratios of preferably about 1:1 to 1:6 and more particularly about 1:4.

For flexible coating applications, the liquid prepolymers can be dissolved in a solvent, cast and cured in place to provide outstanding coatings. However, for other applications, particularly laminating, it is preferred that the prepolymers be further condensed by heating prior to use.

In general, prepolymers to be further condensed and thereafter spray dried or dried in a wiped film evaporator or otherwise converted to solvent-soluble liquids or solids that are free from gel, and in the case of solids, that are tack free at room temperature are prepared by:

(I) Heating at a pH of 7 a mixture of (A) a silane that is methyltrialkoxysilane, phenyltrialkoxysilane, or mixtures thereof in which the alkoxy radical contains from 1 to 6 carbon atoms and preferably 2 to 3 carbon atoms; and (B) at least a trace of a hydrolysis catalyst comprising a ferric alkoxide or a ferric chelate and at least about 1.5 moles of water for every mole of total silane present, at a temperature preferably of about 65° to 85° C. for a period of time of from about 1 to about 10 hours; and (II) Concentrating the liquid siloxane partial condensation product from Step I to remove some but not all volatile material including alkanol by-product and some water and to obtain a liquid residue having a viscosity equivalent to that of about 30 to 310 centipoises at 60% solids at 25° C. in ethanol.

Thereafter the prepolymer product of Step II is precured or further condensed at a temperature of from about slightly below, say 5° C., to as much as about 50° C. below the gel point of the resin, for a period of time of from about 10 seconds to about 60 minutes, the 60 minutes requiring the lower temperatures. As previously indicated, the precuring can be accomplished in an economical and quite reproducible manner in a wiped film evaporator by forming a liquid film of the prepolymer product of Step II and heating the same at about 90° to 180° C.

As used here, the gel point is that temperature at which a 50 gram sample of prepolymer gels when placed in a 100 ml. beaker and stirred on a 600° F. hot plate.

The mixture of methyl and phenyl precured polymers is preferably made by (I) Heating a mixture of (A) from about 1 to about 2 moles of methyltriethoxysilane and from about 6 to 1 mole of phenyltriethoxysilane; (B) from about 1.5 to about 3, 4, or even 5 moles of water for every mole of total silane present, there being at least a trace and preferably about 20 parts by weight of iron in the form of a ferric alkoxide or a ferric chelate present in the reaction mixture per million parts of water and silane at a temperature of about 80° C. for a period of time of from about 2 to about 6 hours; and thereafter, the mixture is further processed by (II) Concentrating the liquid siloxane partial condensation product from Step I by distilling at the reaction temperature until approximately 60–70% of the theoretical yield of ethanol is removed, thereby to remove some but not all volatile material including alkanol by-product and some water and to obtain a liquid residue that in the case of a methylsilane/phenylsilane ratio of about 2.5:1 to 1.5:1 has a viscosity of about 30 to 60 or 65 centipoises at 60% solids and 25° C. in ethanol or in the case of a methyl/phenyl ratio of about 1:3.5 to 1:4.5 has a viscosity of about 150 to 310 centipoises; and (III) Precuring the prepolymer product of Step II preferably by forming a thin film thereof by heating the film to a temperature of from about 140° to 190° C. which is a temperature of from about slightly below the gel point to about 30° C. below the gel point of the resin and holding this temperature for a period of time of from about 5 to 10 up to about 120 seconds.

Step III above is preferably accomplished by a heating of the liquid film of a prepolymer having a predetermined gel point of about 175° to 210° C. at about 170° to about 190° or 195°.

The precured polymer from the methyltrialkoxysilane is generally prepared by a method that includes the steps of (I) Heating at a pH of 7 a mixture of (A) a methyltrialkoxysilane wherein the alkoxy radical contains less than 4 carbon atoms and from 0 to 5 mole percent, based on total silane reactant material, of at least one compound represented by the general formula

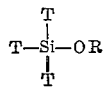

wherein R in the alkoxy radical —OR represents an alkyl radical having less than 4 carbon atoms such as methoxy and ethoxy, and each T independently represents an aryl, alkyl or alkenyl radical, each of which contains less than 7 carbon atoms, or the aforementioned alkoxy radical, —OR, and (B) from 1.5 to about 10 moles and preferably from 2 to about 4 moles of water per mole of total silane reactant material, said mixture containing by weight from 10 to 200 parts of iron in the form of a ferric alkoxide or ferric chelate hydrolysis catalyst per million parts of total silane and water, the heating of the said mixture to form a liquid siloxane partial condensation product being continued for about 1 to 10 hours at temperatures of at least 50° C. while retaining in said mixture at least 1.5 moles of alkanol by-product per mole of silane starting material assuming complete hydrolysis of all alkoxy-silicon linkages in the liquid reaction mixture;

(II) Concentrating the liquid siloxane partial condensation product from Step I by gradually raising its temperature above its initial reaction temperature to a maximum temperature within the range of from about 65° to 300° C. and preferably about 80° to 85° thereby to remove some but not all volatile material including alkanol by-product and some water and to obtain a liquid residue having a viscosity equivalent to that of about 15 to 35 centipoises at 50% solids at 25° C. in ethanol (which is about 21 to 41 centipoises at 60% solids at 25° C. in ethanol); and (III) Precuring the concentrated liquid siloxane partial condensation prepolymer product from Step II by heating the product preferably in the form of a liquid film at a temperature of about 140° to 180° C. which is generally slightly below its gelation point to remove the remainder of the volatile material and to obtain, without gelation, a more highly condensed, organic solvent-soluble, siloxane partial condensation precured polymer product that is capable of being finally cured to a solid organopolysiloxane resin. The precured resin, as previously indicated, when solid is also tack free at room temperature and is substantially free from gel. When the precured polymer is liquid, the prepolymer is generally heated from about 85° to 90° C. to about 180° C. preferably in the form of a thin film. The liquid precured product when solidified is also free from gel and capable of forming consistently good flexible coatings.

In preparing a general purpose precured polymer from a mixture of methyl and phenyltrialkoxysilanes in which the ratio of methyl/phenyl is about 1.5:1 to 2.5:1, the liquid film is preferably one as described in Step II above that has been further heated to give a viscosity equivalent to that of about 50 to 65 centipoises and optimally, 55 to 60 centipoises, at 60% solids at 25° C. in ethanol, and the heating of the film is preferably conducted at about 160° to 180° C., and optimally, about 165 to 175° C.

Unless otherwise noted, the viscosity in centipoises used herein is that measured with an RVF Brookfield viscometer in accordance with ASTM 2196–63T, "Rheological Properties of Non-Newtonian Liquids."

The following examples are intended to illustrate the present invention and not to limit the same in any way.

EXAMPLE 1

An organopolysiloxane prepolymer was prepared from methyltriethoxysilane and phenyltriethoxysilane monomers, each of which was purified by distillation from aqueous saturated sodium carbonate solution to about zero parts by weight of HCl per million parts of silane (i.e., no acid) to provide substantially neutral conditions. The above-described mixture of methyl and phenyltriethoxysilane monomers was hydrolyzed with water and an iron containing hydrolysis catalyst and condensed according to the formulation set forth below:

|  | Grams | Moles |
| --- | --- | --- |
| Ingredients: | | |
| Methyltriethoxysilane | 71.2 | 0.4 |
| Phenyltriethoxysilane | 48.0 | 0.2 |
| Water | 24.3 | 1.35 |
| Ferric tributoxide | 0.08 | (¹) |

¹ About 40 parts iron per million parts of silane plus water.

The above-identified reaction mixture was heated with agitation in a flask equipped with a condenser until the pot temperature reached 80° C. The reaction mixture became clear after one hour and was then refluxed for a total of four hours to obtain an organopolysiloxane partial condensation product prepolymer. After the reflux period, water plus ethanol was distilled from the reaction mixture until the temperature reached 90° C.

A precured further curable polymer having a viscosity of about 60 centipoises at 60% solids at 25° C. in ethanol was obtained. The precured further curable polymer was mixed with enough n-butanol to provide a 50% by weight solids solution.

Aluminum panels were dip coated from this solution. The coatings were heat cured at 175° C. for 17 minutes at a film thickness of 0.5 mil. Excellent hard, clear coatings were obtained. The coatings survived 40% impact elongation tests.

An organopolysiloxane prepared from the same monomers but with an acid catalyst (10 p.p.m. HCl by weight) was tested for comparison. Most of the acid-catalyzed polymer coatings passed the 10–20% impact elongation tests indicating better impact resistance and flexibility for the iron-catalyzed polymer coatings.

Copper panels were also dip coated from the solution, the copper panels being cured at 135° C. for 30 minutes at a film thickness of 0.5 mil. The coatings passed the 60% impact elongation tests compared to the 10–20% impact elongation demonstrated by the acid-catalyzed polymer coatings.

The above-reported impact elongation tests to determine the impact flexibility of the coatings were made with a G.E. impact flexibility tester. This instrument generally determines the relative flexibility of a paint, varnish or enamel film expressed as percentage elongation, in a range of 0.5 to 60% as based on the impact of a solid metal cylinder dropped through a guide track from a height of 4 feet onto the reverse side of a coated test panel. The end of the cylindrical impactor is studded with a group of spherical knobs varying in size and calibrated in terms of percent flexibility, based on the elongation or draw they can produce in a metal panel. A reading is made by observing the last indentation in ascending order to show no cracking of the coating.

EXAMPLE 2

A precured polymer was prepared as described in Example 1 except that ferric triacetylacetonate (about 30 parts per million iron) was used in place of the ferric tributoxide. Coatings were prepared therefrom according to the methods described in Example 1.

The impact tester results are as follows:

|  | Aluminum Panels | Copper Panels |
| --- | --- | --- |
| Standard-acid-catalyzed | Passed 10–20% | Passed 10–20%. |
| Ferric triacetylacetonate-catalyzed. | Passed 20% | Passed 20%. |

EXAMPLE 3

A precured polymer was prepared and described in Example 2, only in this case the polymer was prepared from methyltriethoxysilane only, i.e., no phenyltriethoxysilane. Coated aluminum and copper panels were prepared, the results of impact tests being as follows:

Al coated panel—passed 5%
Cu coated panel—passed 20%

Results obtained from coated panels in which the coatings were made from an acid catalyzed solution (described in Example 2) used for comparison were similar.

EXAMPLE 4

An organopolysiloxane was made from the following formulation:

|  | Grams | Moles |
| --- | --- | --- |
| Ingredients: |  |  |
| Phenyltriethoxysilane | 960.4 | 4 |
| Methyltriethoxysilane | 178.1 | 1 |
| Water | 360.0 | 20 |
| Ferric tributoxide | 0.8 | (¹) |

¹ 40 parts by weight of iron per million parts of silane and water.

Ferric tributoxide was added to the mixture of silanes and a clear solution resulted. Upon adding water, the solution became slightly cloudy. Upon heating for 20 minutes, the solution cleared. Thereafter, the solution was refluxed for four hours, the pot temperature dropping to 82° C.

The reaction mixture was concentrated by heating to 90° C. to remove about 85% of the ethanol and water. The resultant concentrated organopolysiloxane prepolymer solution was further heated in an open beaker to 175° C. This viscous further condensed polymer was dissolved in xylene to provide a 50% solids solution.

Style 181 heat clean and neutral pH E-glass cloth was dipped in the 50% solution and air dried for 2 hours. The cloth was then cut into squares 7" x 7"; these were stacked to give 14 plies and the stack placed in a press preheated to 400° F. Slight pressure was applied until resin gelled (10 minutes) and then pressure increased to 500 p.s.i. After 30 minutes the press was cooled to 200° F. and the laminate removed. The resin pick-up was 18% by weight.

The laminates were run through a heating cycle and tested, the heating cycle being as follows.

| Hours: | ° C. |
| --- | --- |
| 1 | 130 |
| 2 | 150 |
| 2 | 180 |
| 2 | 205 |
| 2 | 230 |
| 12 | 250 |

The laminates were tested at room temperature, the flexural strength being 33,500 p.s.i., and the tangent modulus $3.2 \times 10^6$ p.s.i. Laminates were again tested at room temperature after further heating at 300° C. for 200 hours and were found to have a flexural strength in the neighborhood of about 25,000 p.s.i. and tangent modulus of about $3 \times 10^6$ p.s.i.

The hydrolysis and condensation reactions of Example 1 were attempted by using water alone (no catalyst). The reaction mixture did not form clear solutions over a period of 6 hours at 85° C. and hence the reactions were undesirable without the ferric alkoxide or ferric chelate.

In the above examples, other ferric alkoxides such as ferric triethoxide and ferric tripropoxide or ferric chelates such as ferric dibutoxymonoacetylacetonate can be used as the hydrolysis catalyst to provide substantially similar results.

It is to be understood that various modifications of the invention herein described may be made without departing from the spirit and scope thereof.

What is claimed is:
1. A method of hydrolyzing an organic trialkoxysilane monomer and preparing a solvent-soluble further curable organopolysiloxane prepolymer therefrom, the method comprising the steps of:
 (A) heating under neutral conditions a mixture of
  (1) a silane which is selected from the group consisting of methyltrialkoxysilane, phenyltrialkoxysilane and mixtures thereof in which the alkoxy group contains 1 to 6 carbon atoms;
  (2) an effective catalytic amount of an iron containing hydrolysis catalyst of the group consisting of ferric chelates and ferric alkoxides in which the alkoxy group has 1 to 6 carbon atoms; and
  (3) at least about 1.5 moles of water for every mole of silane at a temperature of about 25° to 160° C. for about 1 to 20 hours to form an organopolysiloxane partial condensation product prepolymer having a viscosity equivalent to that of about 30 to 310 centipoises at 60% solids at 25° C. in ethanol; and
 (B) separating from the reaction mixture the resultant prepolymer from Step A to obtain a solvent-soluble further curable organopolysiloxane.
2. A method of hydrolyzing an organic trialkoxysilane monomer and preparing a thermoset organopolysiloxane therefrom, the method comprising the steps of:
 (A) heating under neutral conditions a mixture of
  (1) a silane which is selected from the group consisting of methyltrialkoxysilane, phenyltrialkoxysilane and mixtures thereof in which the alkoxy group contains 1 to 6 carbon atoms;
  (2) an effective catalytic amount of an iron containing hydrolysis catalyst selected from a member of the group consisting of ferric chelates and ferric alkoxides in which the alkoxy radical has 1 to 6 carbon atoms; and
  (3) at least about 1.5 moles of water for every mole of silane at a temperature of about 25° to 160° C. for about 1 to 20 hours to form an organopolysiloxane partial condensation product prepolymer having a viscosity equivalent to that of about 30 to 310 centipoises at 60% solids at 25° C. in ethanol; and
 (B) curing the product of Step A at about 90° to 300° C. for at least about one minute to provide a thermoset organopolysiloxane.

3. A method as defined in claim 1 in which the organopolysiloxane of Step B is mixed with an organic solvent therefor to obtain a solids content of about 20 to 60% by weight.

4. A method as defined in claim 3 in which the solution of claim 3 is applied to a surface to form a solid layer which is cured at about 100 to 300° C. to form a hard acetone resistant coating.

5. A method as defined in claim 1 in which the product of Step B is further condensed at about 90° to 200° C. to provide an organic solvent-soluble, further curable organopolysiloxane.

6. A method as defined in claim 1 in which the silane is methyltriethoxysilane.

7. A method as defined in claim 1 in which the silane is a mixture of methyltriethoxysilane and phenyltriethoxysilane.

8. A method as defined in claim 1 in which the silane is phenyltriethoxysilane.

9. A method as defined in claim 1 in which the hydrolysis catalyst is used in an amount of about 10 to 200 parts by weight of iron per million parts by weight of silane and water.

10. A method as defined in claim 1 in which the hydrolysis catalyst is used in an amount of about 20 to 100 parts by weight of iron per million parts of silane and water.

11. A method as defined in claim 1 in which the hydrolysis catalyst is a ferric trialkoxide where the alkyl radical has 1 to 6 carbon atoms.

12. A method as defined in claim 1 in which the hydrolysis catalyst is ferric tributoxide.

13. A method as defined in claim 1 in which the hydrolysis catalyst is ferric tripropoxide.

14. A method as defined in claim 1 in which the hydrolysis catalyst is a ferric chelate.

15. A method as defined in claim 1 in which the hydrolysis catalyst is a ferric dialkoxymonoacetylacetonate in which the alkoxy radical has 1 to 4 carbon atoms.

16. A method as defined in claim 15 in which the catalyst is ferric dibutoxymonoacetylacetonate.

17. A method as defined in claim 15 in which the catalyst is ferric diisopropoxymonoacetylacetonate.

18. A method as defined in claim 14 in which the hydrolysis catalyst is ferric triacetylacetonate.

19. A method as defined in claim 1 in which the heating of Step A is at about 90° C. for about 4 hours.

20. A method as defined in claim 2 in which the prepolymer of Step B is cured at about 90° C.

21. A method as defined in claim 3 in which the organic solvent is n-butanol.

22. A method as defined in claim 3 in which the organic solvent is xylene.

References Cited

UNITED STATES PATENTS 3,367,910   2/1968   Newing _____ 260—46.5

DONALD E. CZAJA, Primary Examiner

M. I. MARQUIS, Assistant Examiner

U.S. Cl. X.R.

117—135.1, 161; 161—93; 260—33.4, 33.6, 429, 439, 448.2